Feb. 28, 1956

F. PAPRITZ 2,736,250

APPARATUS FOR TAKING STEREOSCOPIC PICTURES
INTENDED FOR MOUNTING IN FRONT OF THE
ADJUSTABLE OBJECTIVE OF A CAMERA FOR
TAKING TWO-DIMENSIONAL PICTURES

Filed Oct. 19, 1953

INVENTOR
Franz Papritz

BY

ATTORNEY

Feb. 28, 1956            F. PAPRITZ            2,736,250
APPARATUS FOR TAKING STEREOSCOPIC PICTURES
INTENDED FOR MOUNTING IN FRONT OF THE
ADJUSTABLE OBJECTIVE OF A CAMERA FOR
TAKING TWO-DIMENSIONAL PICTURES
Filed Oct. 19, 1953            2 Sheets-Sheet 2
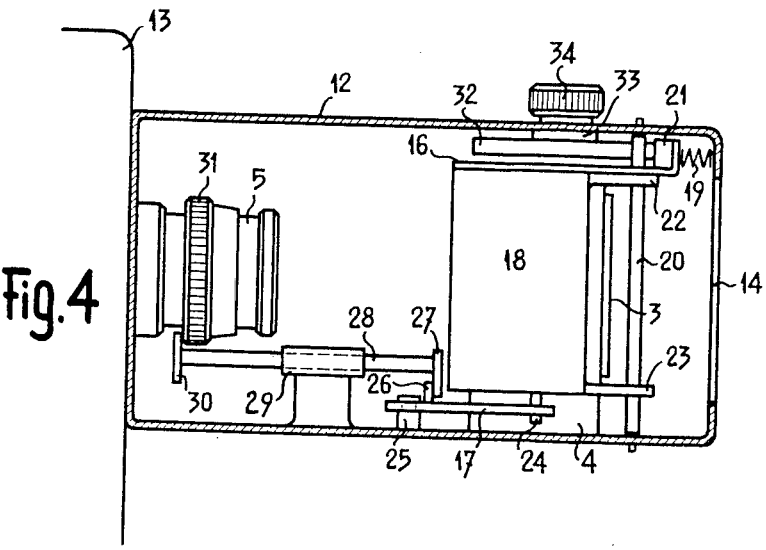
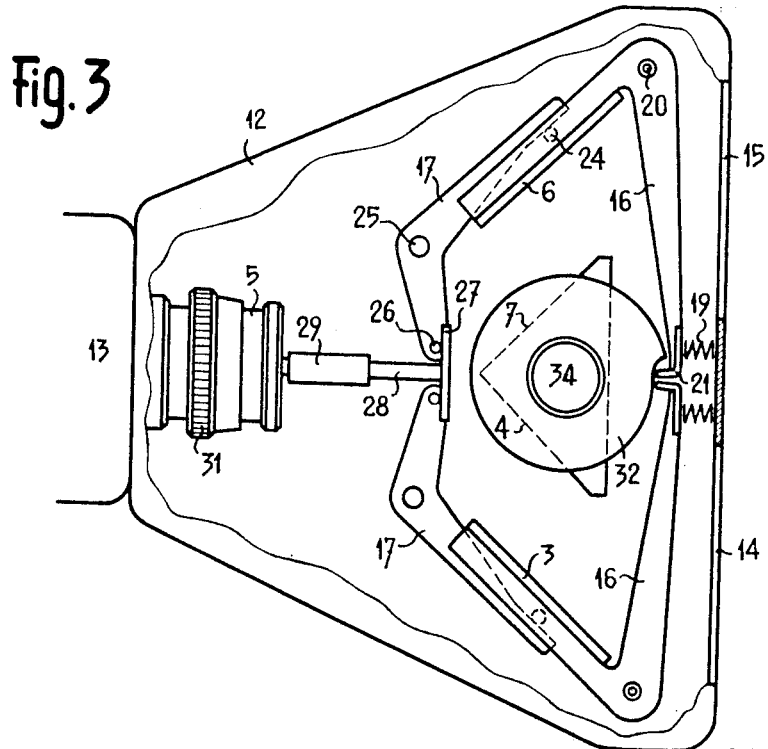
INVENTOR
*Franz Papritz.*
BY
ATTORNEY

United States Patent Office 2,736,250
Patented Feb. 28, 1956

2,736,250
APPARATUS FOR TAKING STEREOSCOPIC PICTURES INTENDED FOR MOUNTING IN FRONT OF THE ADJUSTABLE OBJECTIVE OF A CAMERA FOR TAKING TWO-DIMENSIONAL PICTURES

Franz Papritz, Yverdon, Vaud, Switzerland, assignor to Paillard S. A., Sainte-Croix, Switzerland, a corporation of Switzerland Application October 19, 1953, Serial No. 386,886
Claims priority, application Switzerland May 13, 1953
2 Claims. (Cl. 95—18)

This invention relates to an apparatus for taking stereoscopic pictures.

In connection with cameras for taking still pictures or cinematographic pictures, it is known to use apparatus including reflecting surfaces disposed with respect to the objective of the camera in such a manner as to cause the formation of two ray bundles for recording a pair of stereoscopic images upon the film.

In order to satisfy the conditions necessary for having a pleasant stereoscopic view and a fair sharpness of image, the point of convergence of the two optical axes of the ray bundles must not coincide with the plane of maximum sharpness, but must be nearer the camera in general between the object and the latter. Thus it would be advantageous to be able to effect simultaneously with the focusing of the objective, the adjustment of the point of convergence in such a manner that the position of the convergence point with respect to the plane of maximum sharpness is always such that during the projection of a filmed object, it is always sharp and appears to lie behind the screen.

Furthermore, it is always necessary in order to obtain, during projection, special effects so that for instance the impression of the object stepping in front of the screen is created, to be able, when taking the picture, to locate the point of convergence that is behind the plane of maximum sharpness, i. e. behind the object.

The present invention aims to satisfy the above mentioned requirements, and has for an object an apparatus for taking stereoscopic pictures intended to be mounted in front of the adjustable objective of a camera for taking two-dimensional pictures. This apparatus includes reflecting surfaces disposed with respect to the objective in such a way as to enable the creation of two ray bundles for recording on the film pairs of stereoscopic images, the angular position of at least one of these reflecting surfaces being adjustable to permit the variation of the angle of convergence of the two ray bundles.

According to the present invention the apparatus comprises a mechanism for mechanically coupling the objective and the said adjustable reflecting surface in order to make it possible to vary the convergence angle of the ray bundles by means dependent on the focussing means of the objective, including means for selecting, at will, a convergence angle smaller than the one corresponding to an adjustment of the objective focus for a given distance.

The accompanying drawing illustrates diagrammatically and by way of example, a form of execution of the apparatus according to the invention.

Figures 3 and 4 are respectively top plan and side views of the apparatus mounted on a camera, certain parts being cut off or broken away to render the drawing clearer.

Figure 1:
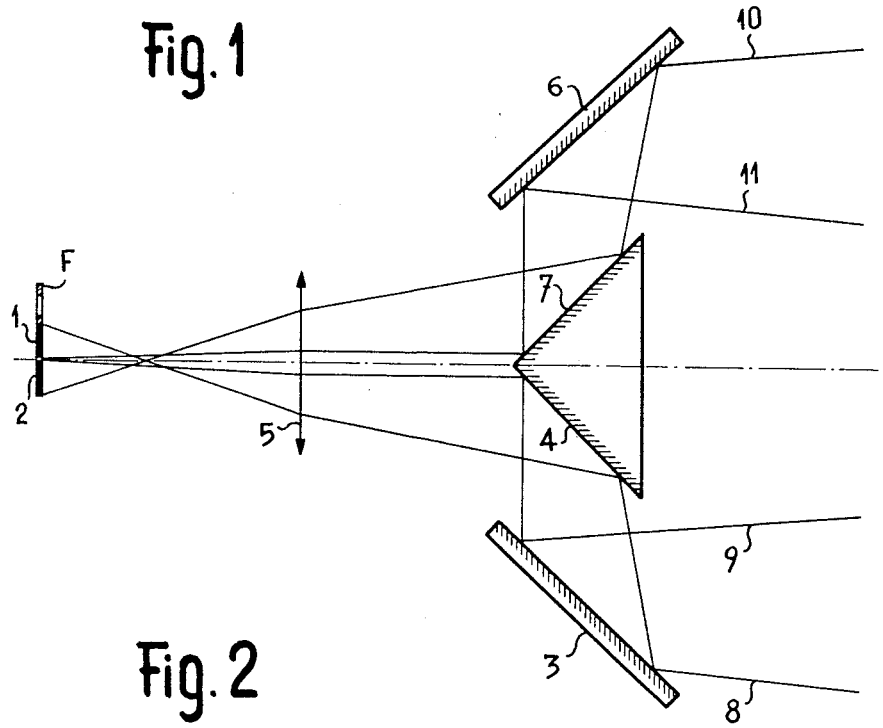
Figures 1 and 2 are explanatory diagrams which will be later referred to more in detail.

The diagram illustrated in Figure 1 shows the arrangement of reflecting surfaces with respect to the objective and the formation of two homologous images 1 and 2 on the film F. As one sees from the diagram the ray bundle lying between the rays 8 and 9 reflected by the reflecting surface 3 on the reflecting surface 4 and by the latter toward the objective 5 forms the image 1, while the bundle included between the rays 10 and 11 reflected by the reflecting surface 6 on the reflecting surface 7 and by the latter toward objective 5 forms image 2. The reflecting surfaces 3 and 6 are generally adjustable to permit the variation of the angle of convergence.

As is well known, the point of convergence places the image outline in space. In order to obtain a pleasant stereoscopic vision, it is generally necessary that the scene appears to lie behind the screen, thus behind the image outline when the picture is taken. The point of convergence ought, then, to lie between an object to be photographed and the camera or on the first plane of the object. Thus if the axes of the two bundles of picture taking rays converge at a distance $b$ from the camera (see diagram represented in Figure 2) the image outline would seem to be situated during projection in the plane B.

The focussing of the objective on a given distance enables one to determine the field of sharpness, the same extending somewhat from the plane of maximum sharpness located at that distance. If the objective is adjusted to a plane A situated at a distance $a$ from the camera (see Figure 2), the sharpness field will extend between planes $A_1$ and $A_2$, located on both sides of plane A at a distance $a_1$ or $a_2$ respectively from the camera. Every object located between the planes $A_1$ and $A_2$ should be sufficiently clear.

As illustrated in Figures 3 and 4, this apparatus comprises a box-like support 12 rigidly fastened to a camera 13 to which an objective 5 is mounted. The support has two openings 14 and 15 intended to facilitate the passage of the two light ray bundles toward the reflecting surfaces 3 and 6 respectively.

In the following description the reflecting surfaces comprised by the apparatus, will be designated as mirrors, it being, however, understood that the reflecting surfaces may be constituted by prisms.

This apparatus comprises two symmetrical parts. Each of the same comprises a pair of two-arm levers 16 and 17, mountings 18 carrying the mirror 3 or 6 respectively, and a compression spring 19. Lever 16 is integral with an axle 20 journaled in the upper and lower wall of box 12. At one of its ends lever 16 includes a part 21 bent at a right angle. The mounting 18 intended to carry mirror 6 or 3 respectively is integral on one hand with lever 16 and axle 20 by means of two ears 22 and 23, and on the other hand, includes a finger 24 intended to cooperate with lever 17 which is fulcrumed on a boss 25 fixed to the lower wall of box 12. Lever 17 comprises at one of its ends a finger 26 provided for cooperation with a plate 27 fast on shaft 28. The same is adapted for sliding lengthwise parallel to the axis of objective 5 in a bearing 29 secured to the lower wall of the box. At its end located alongside objective 5, shaft 28 carries a disc 30 intended for being kept in contact with the ring 18 for adjusting the objective.

The spring 19 reacts on one hand against box 12, and on the other hand, engages part 21 of lever 16 in such a manner that the same is always subjected to the action of spring 19.

An axle 33 is journaled in the upper wall of the box and has on its end projecting outside the box control knob 34, while its other end carries a cam 32. In order to displace the cam 32 angularly in one or the other direction, it is sufficient to turn knob 34. The same carries a scale, the lines of which indicate distances between 0.5 m. and infinity.

The mechanical coupling means between objective 5 and mirrors 3 and 6 described above operates in the following manner:

In order to render the coupling operative, cam 32 must be in the position shown in the drawing (Figure 3). It will occupy this position when the knob 34 is placed in the position indicating 0.5 m. Lever 16 under the influence of spring 19 exerts a push on one of the ends of lever 17 by means of mountings 18 and finger 24. Lever 17 fulcrums on boss 25 until finger 26 engages the plate 27 of shaft 28. The same subjected to a pulling force, slides in bearing 29 and is displaced parallel to the axis of objective 5 until disc 30 engages against ring 31 for adjusting the objective, thereby causing the stoppage of shaft 28. Thus lever 16 under the influence of spring 19 exerts a pull on shaft 28 through the transmitting lever 17 compelling said shaft to remain constantly in contact through disc 30 with ring 31.

The position of ring 31 shown in the drawing is the position most remote from the camera which permits taking pictures at short distances. Likewise the position of mirrors 3 and 6 is the one which permits placing the convergence point nearest the camera.

In order to adjust for a greater distance, one imparts to ring 31 through openings (not shown in the drawings) provided in the box, a rotation which causes same to approach the camera. This results in pushing shaft 28 in the same direction through the intermediary of disc 30. Shaft 28 through plate 27 and finger 26 causes the transmitting lever 17 to fulcrum on boss 25 so that the opposite end of lever 17 exerts a push on finger 24. This causes the lever 16 to pivot in opposition to spring 19.

The mirror 6, the mounting 18 of which is rigid with lever 16, undergoes a change of position with respect to the optical axis of the objective. The same is true of the mirror 3. In other words the angle included between the two mirrors 3 and 6 increases which causes the convergence point to move farther away from the camera (see Figure 1). Also when the objective is set for infinity, the ring 31 being then in its extreme position from the camera side, the mirrors 3 and 6 will be disposed in such a way that the convergence point is located at the point most remote from the camera within the limits set by the camera structure. As apparent the position of lever 16 and consequently the position of mirrors 3 and 6 is determined by the position of ring 31. In other words, the apparatus described permits the adjustment of the convergence point through the intermediary of the adjustment of the objective.

Figure 2:
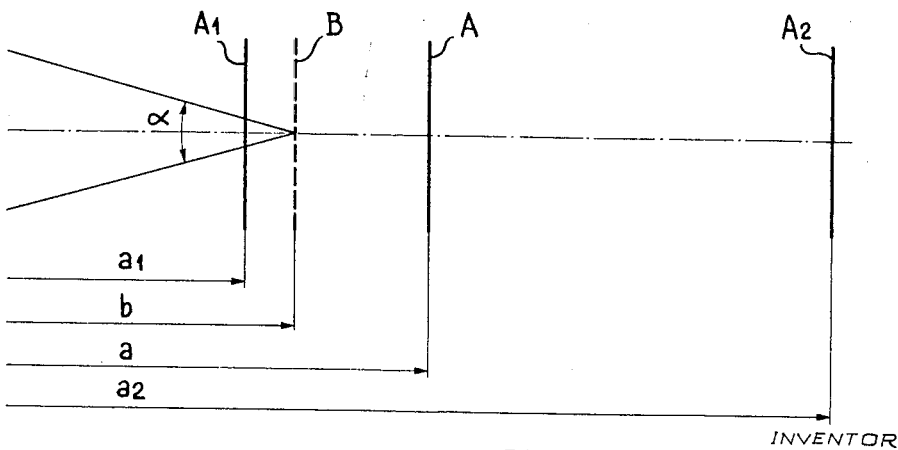

In the above described example, supposing that the camera has an objective, the focal distance of which is 12.5 mm. and the maximum opening f of which is 1.5, with this maximum opening and the objective set for infinity, the sharpness field extends from infinity up to 5.2 m. from the camera ($a_1=5.2$, $a_2=\infty$, see Figure 2). The mechanical coupling between the objective and the mirrors is so arranged for adjusting the objective that the convergence point of the two optical axes is located at a distance of 5.9 m. from the camera ($b=5.9$, see Figure 2).

The table below indicates some values of $b$ as well as the corresponding depth of the stereoscopic field obtained by the described apparatus for different values of $a$.

| a In Meters | b In Meters | Depth of Stereoscopic Field In Meters |
|---|---|---|
| ∞ | 5.9 | 5.9 to ∞ |
| 5 | 2.8 | 2.8 to 20.6 |
| 3 | 2.0 | 2.0 to 5.0 |
| 2 | 1.5 | 1.5 to 2.68 |
| 1 | 0.9 | 0.9 to 1.19 |
| 0.8 | 0.75 | 0.75 to 0.94 |
| 0.6 | 0.58 | 0.58 to 0.68 |
| 0.5 | 0.5 | 0.5 to 0.58 |

Thus, for instance, for an adjustment of the objective to 3 m. ($a=3$ m.), the convergence point and also the image outline will be located at 2 m. ($b=2$ m.) and the depth of the stereoscopic field will range from 2 m. to 5 m.

As appears from the table, the coupling, the operation of which is described above, locates the convergence point automatically according to the setting of the objective and in dependence on the latter.

The described apparatus also permits of locating the convergence point farther away than the plane of maximum sharpness. That is obtained by means of cam 32, the operation of which renders the coupling inoperative in one direction and permits the adjustment of the convergence independently of the setting of the objective. In that case the apparatus functions in the following manner:

When one sets the objective for a desired distance, the knob 34 graduated for distance, being in the position indicating 0.5 m., one adjusts automatically the convergence according to the above table. Thus, for example, if the objective is set for 3 m. ($a=3$ m., see the table and Figure 2), the convergence point is automatically located at 2 m. ($b=2$ m.). If under these circumstances one wishes to locate the convergence point more than 2 m. from the camera while keeping the objective setting for 3 m., one utilizes knob 34. This knob is turned until it occupies the position indicating the distance at which the user wishes to place the convergence point, e. g. 4 m. By turning knob 34 in a direction displacing the convergence point away, the cam 32 is driven in a counter-clockwise direction as seen in Figure 3. Said cam rotates freely, not causing any effect as to the adjustment until the knob is in the position indicating 2 m., that is a position corresponding to the distance at which the convergence point is automatically placed by means of the coupling device controlled by the adjustment of the objective. From that moment on, cam 32 contacts part 21 of lever 16 and by causing same to pivot in opposition to spring 19, causes the change of the positions of mirrors 3, 6 in a direction diminishing the convergence angle α. These mirrors will be so disposed that the convergence point is located at the distance indicated by the control knob 34 of cam 32, i. e., in the particular case at 4 m.

It should be understood that modifications can be made in the apparatus described above. One could, for example, make the box 12 rigid with the movable part of the objective.

In that case the end of shaft 28 cooperating with ring 31 should be integral with the camera. Moreover, compression springs 19 could be replaced by a tensile spring acting between lever 16 and box 12, or by a blade spring.

The lever 16 could be so constructed as to constitute a mounting of mirror 3 or 6 respectively, thereby dispensing with mounting 18. Also, axis 20 could be rigid with the box, lever 16 and mounting 18 being provided for rotating on that axle. Naturally the shape of levers 16 and 17 can also be modified. Furthermore, the finger 26 could be omitted, the end of lever cooperating directly with plate 27.

Also it would be possible to provide similar apparatus permitting the adjustment of mirrors 4 and 7, the mirrors 3 and 6 being fixed, or all of the mirrors could be adjustable. Moreover, a single mirror may be adjustable, while the three other mirrors are stationary.

It should be understood that in all execution forms the mirrors could be replaced by reflecting surfaces representing prisms.

I claim:

1. Apparatus for making stereopictures, comprising, in combination, a camera having an objective including an adjusting member, a support member secured to the camera, reflecting means pivotally mounted on said support member for varying the convergence angle included between a pair of ray bundles reflected by the reflecting means and for recording a pair of similar images on a film, said reflecting means including two reflecting surface members, a first pair of levers fulcrumed on said support member, each of said two reflecting surface members being mounted on the respective lever of said first pair of levers, a mechanism for operating said adjusting member, thereby varying the convergence angle, said mechanism coupling said adjusting member and said reflecting means, said mechanism including a shaft slidably mounted on said support member, said shaft engaging said objective adjusting member, a second pair of levers fulcrumed on said support member, each of said second pair of levers being operatively connected to said shaft and to each of the respective levers of said first pair of levers, selectively operable means for rendering the convergence angle smaller than the angle corresponding to a given adjustment of the objective adjusting member, said means being operatively connected to said first pair of levers and to said support member, spring means for urging said first pair of levers and said reflecting surfaces mounted thereon in a direction increasing the convergence angle and for urging said shaft into engagement with said objective adjusting member, said spring means being mounted on said support member and being operatively connected to said first pair of levers, whereby every adjustment of the objective automatically varies the angle of convergence.

2. Apparatus for making stereopictures, comprising, in combination, a camera having an objective including an adjusting member, a support member secured to the camera, reflecting means pivotally mounted on said support member for varying the convergence angle included between a pair of ray bundles reflected by the reflecting means and for recording a pair of similar images on a film, said reflecting means including two reflecting surface members, a first pair of levers fulcrumed on said support member, each of said two reflecting surface members being mounted on the respective lever of said first pair of levers, a mechanism for operating said adjusting member, thereby varying the convergence angle, said mechanism coupling said adjusting member and said reflecting means, said mechanism including a shaft slidably mounted on said support member, said shaft engaging said objective adjusting member, a second pair of levers fulcrumed on said support member, each of said second pair of levers being operatively connected to said shaft and to each of the respective levers of said first pair of levers, spring means for urging said first pair of levers and said reflecting surfaces mounted thereon in a direction increasing the convergence angle and for urging said shaft into engagement with said objective adjusting member, said spring means being mounted on said support member and being operatively connected to said first pair of levers, selectively operable means for rendering the convergence angle smaller than the angle corresponding to a given adjustment of the objective adjusting member, said means including an axle rotatably mounted in said support member, a cam rotatably mounted on said axle and pivotally mounted in said support member, said cam being operatively connected to said first pair of levers, and a control knob means operatively connected to said cam and mounted on said support for causing the cam to swing the first pair of levers in opposition to said spring means, whereby the convergence angle is diminished to a value below the valve determined by the adjustment of the objective to a given distance.

References Cited in the file of this patent

UNITED STATES PATENTS

| 2,365,212 | Oriol | Dec. 19, 1944 |
| 2,413,996 | Ramsdell | Jan. 7, 1947 |

FOREIGN PATENTS

| 178,800 | Great Britain | Nov. 3, 1921 |